United States Patent
Phillips

(10) Patent No.: US 12,493,933 B2
(45) Date of Patent: Dec. 9, 2025

(54) MOTION-INDUCED BLURRING TO REDUCE SCINTILLATIONS AND AN APPEARANCE OF A BOUNDARY SEPARATING REGIONS OF A DISPLAY

(71) Applicant: Google LLC, Mountain View, CA (US)

(72) Inventor: Jonathan Blair Phillips, San Jose, CA (US)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 18/546,240

(22) PCT Filed: Mar. 8, 2021

(86) PCT No.: PCT/US2021/021353
§ 371 (c)(1),
(2) Date: Aug. 11, 2023

(87) PCT Pub. No.: WO2022/191817
PCT Pub. Date: Sep. 15, 2022

(65) Prior Publication Data
US 2024/0112312 A1   Apr. 4, 2024

(51) Int. Cl.
*G06T 5/70* (2024.01)
*G06F 3/01* (2006.01)

(52) U.S. Cl.
CPC ............... *G06T 5/70* (2024.01); *G06F 3/016* (2013.01); *G06T 2207/20201* (2013.01)

(58) Field of Classification Search
CPC . G06T 5/70; G06T 2207/20201; G06T 11/00; G06T 2207/20182; G06F 3/016; G06F 3/14

(Continued)

(56) References Cited

U.S. PATENT DOCUMENTS

| 2004/0061795 A1 | 4/2004 | Kondo et al. |
| 2009/0316009 A1 | 12/2009 | Ito et al. |

(Continued)

FOREIGN PATENT DOCUMENTS

| CN | 105769180 B | 7/2019 |
| CN | 111078170 | 4/2020 |

(Continued)

OTHER PUBLICATIONS

"International Preliminary Report on Patentability", Application No. PCT/US2021/021353, Sep. 12, 2023, 8 pages.

(Continued)

*Primary Examiner* — Neil R Mclean
(74) *Attorney, Agent, or Firm* — Colby Nipper PLLC

(57) ABSTRACT

This document describes techniques and devices for motion-induced blurring to reduce an appearance of a boundary separating regions of a display. Sensors (e.g., cameras, microphones, biometric sensors, ambient light sensors, radar sensors, and so forth) may be placed at least partially underneath regions of a display. Placing a sensor underneath a region of a display, however, often requires reduced pixel-density (e.g., relatively low resolution), which can cause scintillations of the content as it moves on the display. The techniques described herein address some undesirable effects of this reduced pixel-density by blurring content moving within regions of low resolution. Furthermore, the techniques can adjust an amount of blurring based on a speed of the moving content. Thus, when the display includes regions of differing resolutions, the techniques described herein can blur the moving content to reduce the appearance of a boundary separating these regions of differing resolutions.

20 Claims, 11 Drawing Sheets

(58) Field of Classification Search
 USPC .......................................................... 382/254
 See application file for complete search history.

(56) References Cited

U.S. PATENT DOCUMENTS

| | | | |
|---|---|---|---|
| 2010/0201709 | A1 | 8/2010 | Yang et al. |
| 2018/0027262 | A1 | 1/2018 | Reinhard et al. |
| 2018/0033120 | A1 | 2/2018 | Wang et al. |
| 2018/0220101 | A1 | 8/2018 | Evans et al. |
| 2021/0020139 | A1* | 1/2021 | Ekstrand .................. G06T 3/20 |
| 2021/0104208 | A1 | 4/2021 | Goodsitt et al. |
| 2021/0117076 | A1 | 4/2021 | Conn et al. |
| 2021/0168282 | A1* | 6/2021 | Geng ........................ G06T 7/44 |

FOREIGN PATENT DOCUMENTS

| | | |
|---|---|---|
| CN | 111480192 | 7/2022 |
| EP | 3143598 | 3/2017 |
| JP | 2008146190 A | 6/2008 |
| JP | 2010015483 A | 1/2010 |
| JP | 2017058671 A | 3/2017 |
| JP | 2019020901 A | 2/2019 |
| TW | I687896 | 6/2019 |
| WO | 2020015724 A1 | 1/2020 |
| WO | 2022191817 | 9/2022 |

OTHER PUBLICATIONS

"Foreign Office Action", JP Application No. 2023-543403, Oct. 22, 2024, 8 pages.
"Foreign Office Action", KR Application No. 10-2023-7024087, Oct. 23, 2024, 6 pages.
"Foreign Office Action", TW Application No. 112125258, Nov. 8, 2024, 8 pages.
"Foreign Office Action", TW Application No. 110131581, Jul. 20, 2022, 13 pages.
"International Search Report and Written Opinion", Application No. PCT/US2021/021353, Jan. 5, 2022, 11 pages.
Huang, Sianyi, "Localized Brightness Adjustment Method", Dec. 26, 2021, 11 pages.
Yalanska, Marina, "UX Design: How to Make User Interface Readable", Accessed online at: https://blog.tubikstudio.com/ux-design-readable-user-interface/ on Oct. 5, 2021, 24 pages.
"Foreign Office Action", JP Application No. 2023-543403, May 13, 2025, 5 pages.

* cited by examiner

MOTION-INDUCED BLURRING TO REDUCE SCINTILLATIONS AND AN APPEARANCE OF A BOUNDARY SEPARATING REGIONS OF A DISPLAY

RELATED APPLICATION(S)

This application is a national stage entry of International Application No. PCT/US2021/021353, filed Mar. 8, 2021, the disclosure of which is incorporated herein by reference in its entirety.

BACKGROUND

Positioning sensors underneath a display of a computing device is a desirable way to increase the display's size because it frees up space that would otherwise be used for sensors, such as a camera or infrared sensor. To enable use of these under-display sensors, some devices have a lower pixel-density in regions of the display having under-display sensors. A pixel density may be reduced in a region, for example, to allow for light to be collected by a camera that is underneath the display. As content moves within the display, however, scintillations may occur within regions of lower pixel-density. These undesirable scintillations are often visible at boundaries separating regions of the display, thereby degrading a user experience. Therefore, it is desirable to reduce the appearance of boundaries separating regions of the display and reduce scintillations within regions of lower pixel-density. By so doing, the user experience can be improved.

SUMMARY

This document describes techniques and devices for motion-induced blurring to reduce scintillations and an appearance of a boundary separating regions of a display. Sensors (e.g., cameras, microphones, biometric sensors, ambient light sensors, radar sensors, and so forth) may be placed at least partially underneath regions of a display. Placing a sensor underneath a region of a display, however, often requires the region to have a reduced pixel-density (e.g., a relatively low resolution compared to other regions of the display), which can cause scintillations of the content as it moves on the display. The techniques described herein address some undesirable effects of this lower pixel-density by blurring content moving within regions of low resolution. Furthermore, the techniques can adjust an amount of blurring based on a rate or speed of the moving content. Thus, when the display includes regions of differing resolutions, the techniques described herein can blur the moving content to reduce scintillations and the appearance of a boundary separating these regions of differing resolutions.

Aspects described below include a method, system, apparatus, and means of motion-induced blurring to reduce scintillations and an appearance of a boundary separating regions of a display. The method includes receiving a first resolution of a first region of a display of a computing device. The first resolution corresponds to a first pixel-density. A second resolution of a second region of the display of the computing device is also received. The second resolution corresponds to a second pixel-density, which is lower than the first pixel-density. The method determines a speed at which content is intended to be moved on the display. This moving content within the second region is blurred based on the speed of the moving content, transforming the moving content into a blurred moving content. The blurred moving content reduces scintillations of the moving content within the second region of the display. An appearance of a boundary separating the first region and the second region of the display of the computing device is also reduced relative to an appearance of the boundary, were the moving content to remain unblurred. The blurred moving content is then displayed within the second region, and the moving content is displayed within the first region.

BRIEF DESCRIPTION OF DRAWINGS

Apparatuses and techniques for motion-induced blurring to reduce scintillations and an appearance of a boundary separating regions of a display are described with reference to the following diagrams.

The same numbers are used throughout the drawings to reference like features and components:

FIG. 6-1 illustrates an example haptic input from a user that changes a size and/or position of the moving content;

FIG. 6-2 illustrates two examples of a blurring module applying the motion-induced blurring to the moving content based on the haptic speed;

DETAILED DESCRIPTION

Overview

Figure 1:
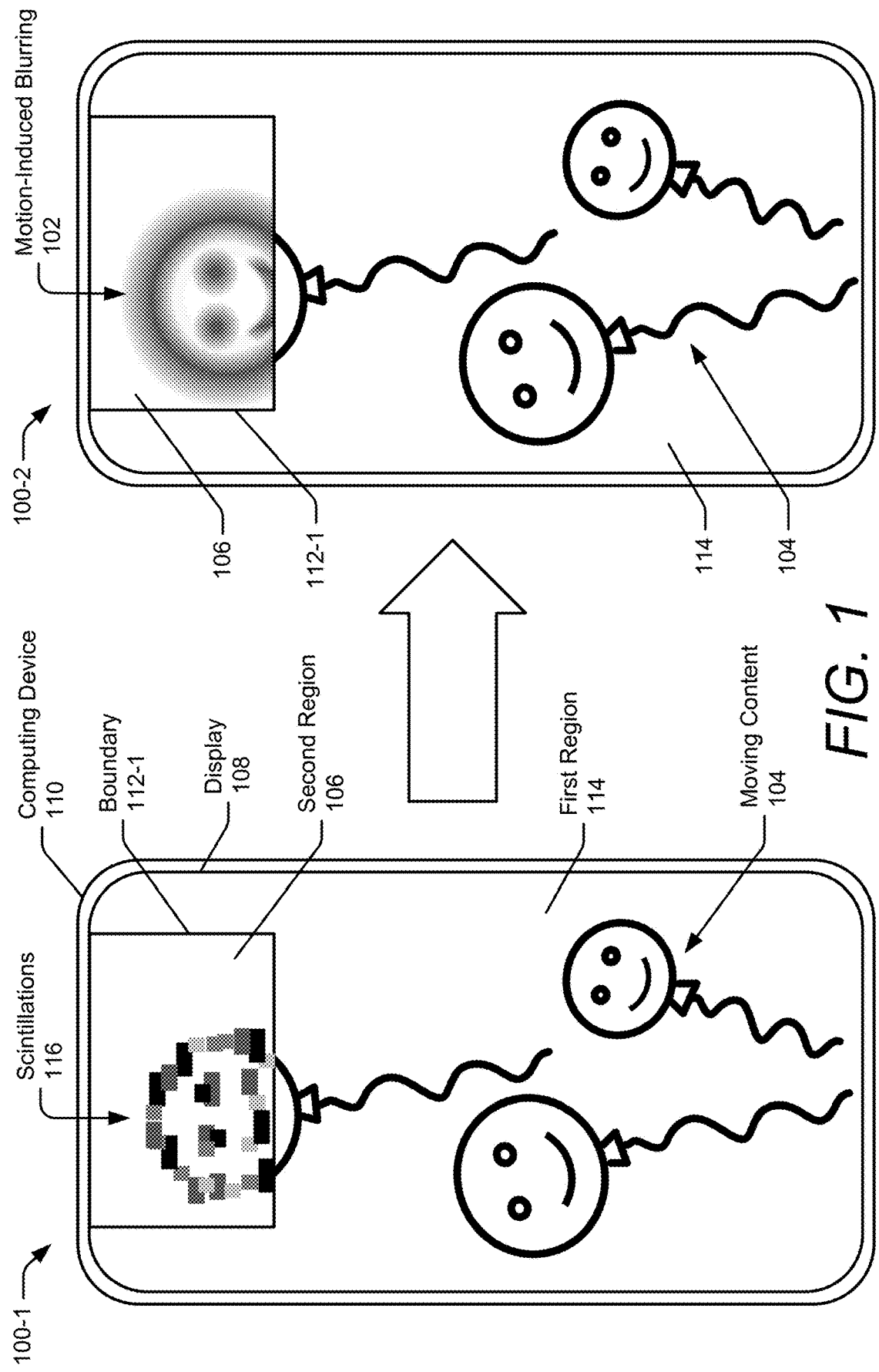
FIG. 1 illustrates an example implementation of the techniques of motion-induced blurring of a moving content within a second region of a display of a computing device.

Positioning sensors underneath a display of a computing device is becoming a desirable way to increase a size of the display used to view content. Some devices use a lower pixel-density (e.g., have a lower a resolution) in regions of the display that include sensors to enable operations of those sensors. A pixel density is lower in a region, for example, to allow for light to be collected by a camera for a photograph or video. As content moves within the display, scintillations occur within regions of low resolution (e.g., lower pixel-density). These scintillations increase an appearance of a boundary separating regions of low resolution from regions of higher resolution (e.g., that do not include sensors). Scintillations can distract a user, and the appearance of the boundary can diminish the user experience.

In contrast to the techniques described herein, some devices do not display moving content in regions of low resolution, limiting the usable size of the display. Other devices display the moving content at a low resolution without blurring the moving content. These other devices permit the moving content to appear pixelated and result in scintillations that are more apparent as a rate or speed of the moving content increases. Other devices may blur the moving content by a fixed amount of blurring, which is only appropriate for specific speeds (e.g., stationary content, content that moves slow, or content that moves fast). For example, if a mobile phone includes a region with an associated fixed amount of blurring (e.g., configured for stationary content that does not move over time), and the user decides to watch an action movie on their phone, scintillations appear as the speed of content within the action movie increases. The user may become distracted by these scintillations and miss an important scene in the movie or become frustrated and watch the movie on a different device. If, instead, the fixed amount of blurring accommodates content that moves fast (e.g., at a speed of the action movie) but the user would like to read the news (e.g., stationary content), the content could be blurred too much. The user may struggle to read sentences and headlines of the news that appear within the region blurred. In this case, the user would benefit from the pixelated content and a reduced amount of blurring.

To address these challenges, this document describes a method of motion-induced blurring that reduces scintillations and an appearance of a boundary separating regions of a display. Moving content within these regions can be blurred, for example, using a smoothing filter with an adjustable weight. This weight can be adjusted based on the rate or speed of the moving content. Reference may be made herein to a speed of the moving content, which can include a velocity, an acceleration, or a rate of the moving content. The speed of the moving content may also include speeds averaged over a duration of time or instantaneous speeds of the moving content. The techniques of the motion-induced blurring can increase the amount of blurring when a speed of the moving content increases, such as the user watching an action movie. The amount of blurring can also be reduced as the speed of the content decreases, such as a slow scroll of a webpage based on a haptic input from the user.

The techniques, in some cases, refrain from applying the motion-induced blurring within regions containing resolutions lower than a resolution threshold. For example, if the resolution threshold is 300 pixels per inch (ppi) and a region of the display (e.g., that includes a sensor) displays the moving content at a resolution of 200 ppi, then the motion-induced blurring is applied to moving content within this region to improve the user experience. However, if a region (e.g., that does not include a sensor) displays the moving content at a resolution of 400 ppi, then the motion-induced blurring is not applied to moving content within that region.

The techniques may also refrain from applying the motion-induced blurring when the speed of the moving content is beneath a speed threshold (e.g., below a minimum speed required to perform motion-induced blurring). This enables the user to view stationary content without blurring, even within regions of low resolution. As a result, the motion-induced blurring is applied when it benefits the user most and in an amount that is appropriate for the speed of the moving content.

Example of Motion-Induced Blurring

FIG. 1 illustrates an example implementation of the techniques of motion-induced blurring 102 of a moving content 104 within a second region 106 of a display 108 of a computing device 110. The motion-induced blurring 102 is applied to the moving content 104 to reduce scintillations 116 and an appearance of a boundary 112-1 separating a first region 114 and the second region 106.

While the example computing device 110 described in this publication is a mobile phone, other types of computing devices can also support the techniques described herein. The computing device 110 can include one or more processors including, for example, a central processing unit (CPU), a data processing unit (DPU), a graphics processing unit (GPU), and so forth. The computing device 110 can also include a computer-readable medium (CRM) that includes instructions for directing a blurring module to apply the motion-induced blurring 102 to the moving content 104 when executed by the processor(s). The computing device 110 can also include one or more sensors positioned at least partially underneath the display 108.

The display 108 is configured to at least partially cover a front surface of the computing device 110. In an example environment 100-1, at least one sensor is positioned at least partially underneath the display 108 within the second region 106. In general, each region can contain any number of sensors (e.g., zero, one, two, and so forth), and the computing device 110 can include one or more regions. Furthermore, each region can vary in size, shape, and location. For example, a size of the second region 106 is depicted as smaller than a size of the first region 114 in the example environment 100-1. The display 108 can also include an array of pixels configured to display the moving content 104. Each region can contain a pixel density associated with the array of pixels that is either distinct from or similar to another region of the display 108.

In the example environment 100-1, the second region 106 produces scintillations 116 as the moving content 104 moves between the first region 114 and the second region 106. Scintillations 116 are caused by a low resolution of the second region 106 (e.g., a lower resolution than a resolution of the first region 114) because the low resolution is configured to enable operations of the sensor. For example, a camera may be positioned at least partially underneath the display 108 within the second region 106 to increase a usable size of the display 108 used to view the moving content 104. The camera, however, may need to collect light through the display 108 to produce a photograph or video. Therefore, the low resolution of the second region 106 (e.g., corresponding to fewer pixels per area within the second region 106 than the first region 114) is required to prevent light from being blocked by pixels. If light is blocked by pixels, then the camera could produce distortions within the photograph or video that can frustrate the user.

These scintillations 116 can include distortions, artifacts, and aliasing effects of the moving content 104. While the scintillations 116 described herein predominantly refer to content that is moving on the display 108, these distortions, artifacts, and aliasing effects may affect stationary content. This stationary content may also be blurred using some of the techniques described herein (e.g., a smoothing filter with a weight). For example, a stationary image of a landscape may be blurred to reduce aliasing effects. If that stationary image then moves across the display 108 due to a haptic input from the user, then the techniques of motion-induced blurring 102 can additionally be applied to the landscape image as it moves across the display 108.

To reduce scintillations 116 and an appearance of the boundary 112-1 separating the first region 114 and the second region 106, the techniques of motion-induced blurring 102 are performed within the second region 106 on the moving content 104 as depicted in an example environment 100-2. The moving content 104 refers to content received or stored on the computing device 110 that will move on the display 108 over time. For example, the moving content 104 can include a plurality of images that are consecutively received from a content source by the computing device 110 over time before being displayed consecutively on the display 108. The content of these consecutive images changes over time, resulting in the content moving.

The techniques of motion-induced blurring 102 can utilize a bilateral filter, a smoothing technique, a Gaussian blur, nonlinear filters, wavelet transformations, statistical methods, block-matching algorithms, a machine-learned (ML) model, and so forth, where each of these techniques can include one or more weights configured to increase or decrease an amount of motion-induced blurring 102 applied to the moving content 104. Implementation of the techniques of motion-induced blurring 102 are further described with respect to FIG. 2.

Figure 2:
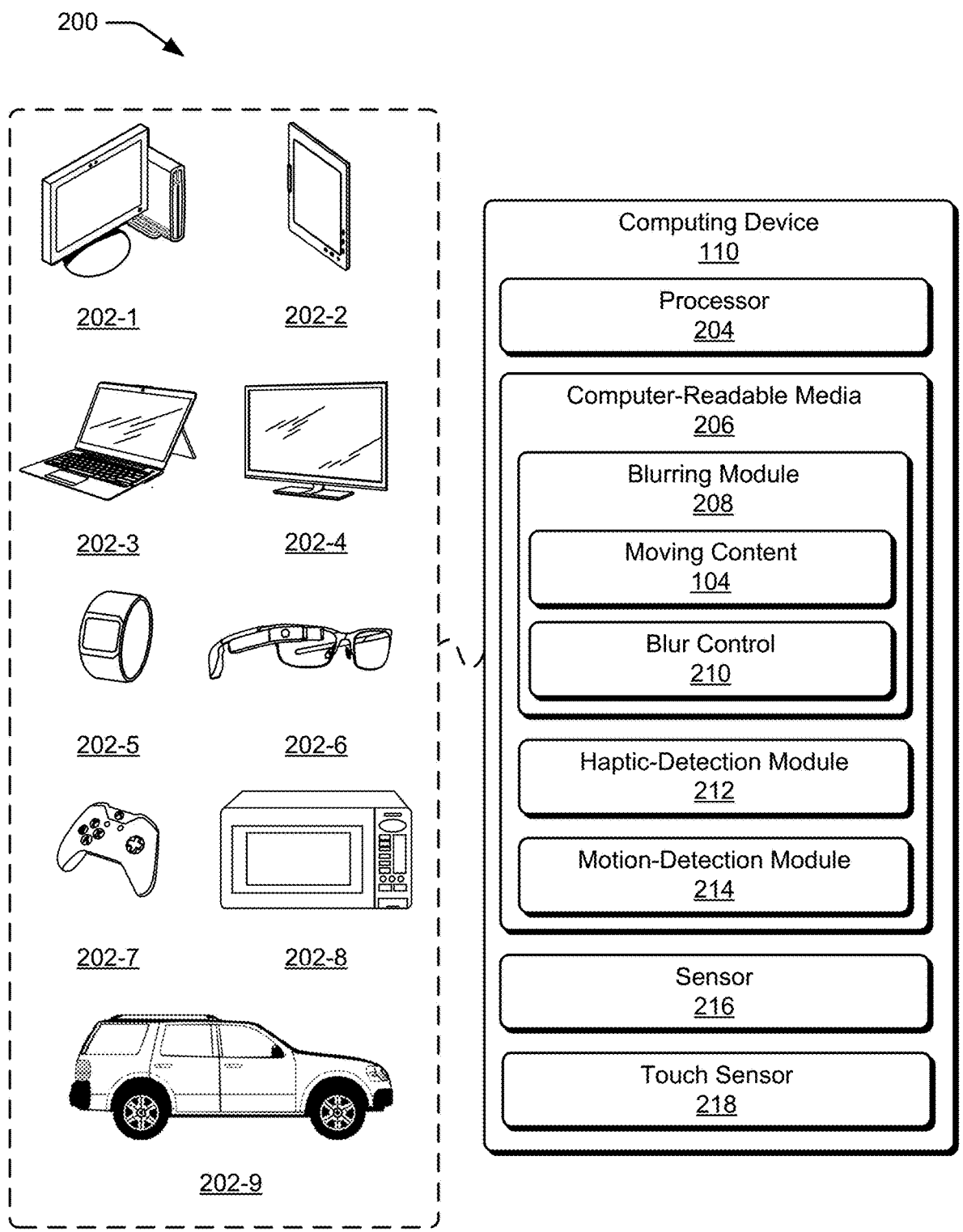
FIG. 2 illustrates an example implementation of the motion-induced blurring as part of the computing device.

FIG. 2 illustrates an example implementation of the techniques of motion-induced blurring 102 as part of the computing device 110. The computing device 110 is illustrated with various non-limiting example devices, including a desktop computer 202-1, a tablet 202-2, a laptop 202-3, a television 202-4, a computing watch 202-5, computing glasses 202-6, a gaming system 202-7, a microwave 202-8, and a vehicle 202-9. Other devices can also be used, including a home-service device, a smart speaker, a smart thermostat, a security camera, a baby monitor, a Wi-Fi® router, a drone, a trackpad, a drawing pad, a netbook, an e-reader, a home-automation and control system, a wall display, a virtual-reality headset, and/or another home appliance. The computing device 110 can be wearable, non-wearable but mobile, or relatively immobile (e.g., desktops and appliances).

The computing device 110 includes one or more processors 204 and one or more computer-readable medium (CRM) 206. Applications and/or an operating system (not shown) embodied as computer-readable instructions on the CRM 206 are executed by the processor 204 and provide some of the functionalities described herein. The CRM 206 also includes a haptic-detection module 212 and a motion-detection module 214. The haptic-detection module 212 and the motion-detection module 214 can be implemented using hardware, software, firmware, or a combination thereof. In this example, the processor 204 implements the haptic-detection module 212 and the motion-detection module 214. Together, the haptic-detection module 212 and the motion-detection module 214 enable the processor 204 to process responses (e.g., input, electrical signals) from, for example, the display 108 and a touch sensor 218 to blur the moving content 104 to reduce scintillation 116 and the appearance of the boundary 112-1 separating regions of the display 108.

The user may move or change content on the display 108 using a haptic input (e.g., a touch, a swipe, a scroll, a tap). To detect haptic inputs, the computing device 110 can include the touch sensor 218 that receives input from the user to change a size and/or position of the moving content 104. The touch sensor 218 can include a capacitive touch sensor, a resistive touch sensor, surface acoustic wave (SAW) technology, an infrared touch sensor, and so forth. For example, the haptic-detection module 212 can detect the haptic input from the user and an associated haptic speed that influences the speed of the moving content 104. The haptic-detection module 212 can signal the processor 204 to execute the techniques of motion-induced blurring 102 based on the haptic speed. Alternatively, the haptic speed can be detected by the operating system, the processor 204, and so forth.

In another example, a speed associated with the moving content 104 can be determined by the motion-detection module 214 in the absence of the haptic input. The motion-detection module 214 detects changes in the moving content 104 over time and/or a source speed from a content source to determine a speed of the moving content 104. The motion-detection module 214 signals the processor 204 to execute the techniques of motion-induced blurring 102 based on the speed. Alternatively, the speed can be detected by the operating system, the processor 204, and so forth.

The CRM 206 additionally includes a blurring module 208 configured to receive inputs from the haptic-detection module 212, the motion-detection module 214, the operating system, the processor 204, the touch sensor 218, and so forth. These inputs can include a speed of the moving content 104, a haptic speed, a source speed, a refresh speed, a minimum speed threshold, a maximum speed threshold, a resolution threshold, a resolution of a region, and so forth. The blurring module 208 uses these inputs to determine if motion-induced blurring 102 should be applied to the moving content 104, how much blurring is required, and signals the processor 204 to apply the motion-induced blurring 102 to the moving content 104.

The blurring module 208 includes the moving content 104 and a blur control 210. In general, the moving content 104 can be separate from the blurring module 208. The blur control 210 is configured to control an amount of the motion-induced blurring 102 applied to the moving content 104. The blur control 210 utilizes the speed of the moving content 104 to determine a numerical value or function of a weight needed to adjust the amount of motion-induced blurring 102 applied to the moving content 104. The blur control 210 adjusts the weight to increase or decrease an amount of the motion-induced blurring 102. The motion-induced blurring 102 can include smoothing of the moving content 104, reducing an intensity associated with features (e.g., details) of the moving content 104, averaging pixel intensities of the moving content 104 based on nearby pixel intensities, and so forth.

The computing device 110 includes one or more sensors 216 positioned at least partially underneath the display 108. The sensor 216 can be positioned in any region, and a resolution (e.g., pixel density) associated with a region containing a sensor 216 can have a lower pixel-density to enable operations of the sensor 216. While use of a sensor positioned underneath a display is often why one portion of a display will have a lower resolution than another, the techniques described herein can be used with any display having varying resolutions; an under-display sensor is not required for the techniques to be used. The techniques of motion-induced blurring 102 are further described with respect to FIG. 3.

Figure 3:
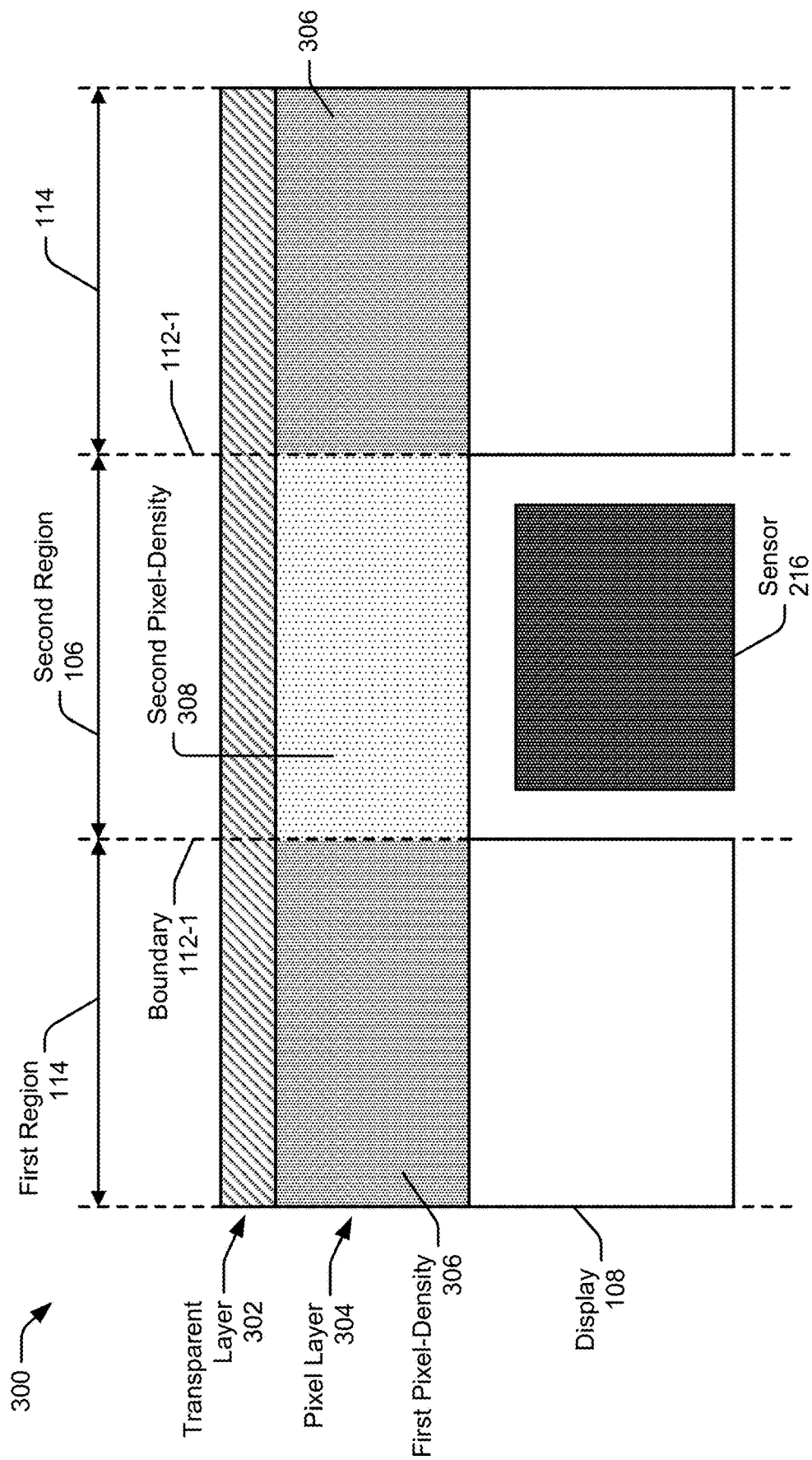
FIG. 3 illustrates an example cross-sectional view of the display of the computing device from FIG. 1.

FIG. 3 depicts an example cross-sectional view of the display 108 of the computing device 110 from FIG. 1. The display 108 is depicted with a transparent layer 302 (e.g., comprising a transparent material such as plastic or glass) positioned above a pixel layer 304 (e.g., comprising the array of pixels).

In general, the display 108 can include an active area, one or more organic layers (e.g., emitting layer, emissive layer, an array of organic light-emitting diodes), a cathode, an anode, and so forth. The display 108 can further include an active-matrix organic light-emitting diode (AMOLED) display, organic light-emitting diode (OLED) display modules, light-emitting diode (LED) display modules, liquid crystal display (LCD) display modules, microLED display modules, display technologies with individually controllable pixels, thin-film technology display modules, and so forth.

In the example environment 300, the first region 114 does not include a sensor; the second region 106 includes a sensor 216 positioned at least partially underneath the display 108 and at least partially within the second region 106. The sensor 216 can include, for example, a camera, a microphone, a speaker, an ambient light sensor, a biometric sensor, an accelerometer, a gyroscope, a magnetometer, a proximity sensor, a global positioning system (GPS), a touchscreen sensor, a health sensor, a barcode or quick response (QR) code sensor, a barometer, a radar sensor and so forth.

The first region 114 includes a first pixel-density 306, and the second region 106 includes a second pixel-density 308. To enable operations of the sensor 216, the second pixel-density 308 is lower than the first pixel-density 306 (e.g., contains fewer pixels per area). The first pixel-density 306 is associated with a first resolution, and the second pixel-density 308 is associated with a second resolution, where the second resolution is lower than the first resolution. To enable discussions herein, the second resolution comprises a low resolution and the second pixel-density 308 comprises a low pixel-density, when compared to the first resolution and the first pixel-density 306, respectively.

The pixel layer 304, including the first pixel-density 306 and the second pixel-density 308, includes color pixels (e.g., red, green, blue (RGB) pixels). These color pixels enable the moving content 104 to be viewed on the display 108 in color. Regions of low resolution include a low density of color pixels (e.g., fewer color pixels per area relative to other, higher-resolution regions). In the second region 106, the second resolution includes a low resolution to enable operations of the sensor 216. As the density of color pixels decreases, color defects (e.g., scintillations 116, color distortions) become more apparent to the user. For example, a low resolution of the second region 106 can cause color defects in an action movie. Since the user has an expectation of what a moving car or a person's face looks like, color defects associated with the moving car or person's face can be noticed by the user. To reduce these color defects, the blurring module 208 applies the motion-induced blurring 102 within the second region 106 to blur the action movie and improve the user experience.

The computing device 110 can refrain from instructing a processor to apply the motion-induced blurring 102 to the moving content 104 unless a resolution of a region is lower than a resolution threshold. The resolution threshold includes a minimum resolution corresponding to a minimum pixel-density required for the motion-induced blurring 102 to be applied to the moving content 104. If a region contains fewer pixels per area than a prescribed amount of pixels per area, corresponding with the minimum resolution, then the blurring module 208 signals a processor to apply the motion-induced blurring 102. For example, the first resolution is high (e.g., contains greater pixels per area than the prescribed amount of pixels per area), enabling the moving content 104 to be displayed without scintillations 116. In this example, the first region 114 does not need the motion-induced blurring 102 applied, and the moving content 104 is displayed normally.

If, however, the second resolution is lower (e.g., contains fewer pixels per area than the prescribed amount of pixels per area), causing scintillations 116 of the moving content 104, then the motion-induced blurring 102 would be applied within the second region 106. In an example, if the resolution threshold is 250 pixels per inch (ppi) and the second resolution is 200 ppi, then the blurring module 208 signals a processor to apply the motion-induced blurring 102 within the second region 106. If the first resolution is 300 ppi, then the blurring module 208 refrains from applying the motion-induced blurring 102 within the first region 114.

Before the moving content 104 is displayed on the computing device 110, the moving content 104 may need to be resampled to conform to the first resolution and second resolution. The moving content 104 can be supplied to the computing device 110 by a content source (e.g., a webpage, a receiver, stored content, an application, and so forth) with a resolution set by the content source (e.g., a source resolution). The blurring module 208 receives the source resolution and compares it to the first resolution and the second resolution.

If the first resolution is different from the source resolution, then the moving content 104 is resampled to conform to the first resolution within the first region 114. For example, if the source resolution is 400 ppi but the first resolution is 300 ppi, then the moving content 104 is resampled from 400 ppi to 300 ppi. The resampling can include mathematical calculations or assumptions of how to change the source resolution to conform to the first resolution. Similarly, if the second resolution is different from the source resolution, then the moving content 104 is resampled to conform to the second resolution within the second region 106. The moving content 104 can be resampled either before or after the motion-induced blurring 102 has been applied to the moving content 104.

Figure 4:
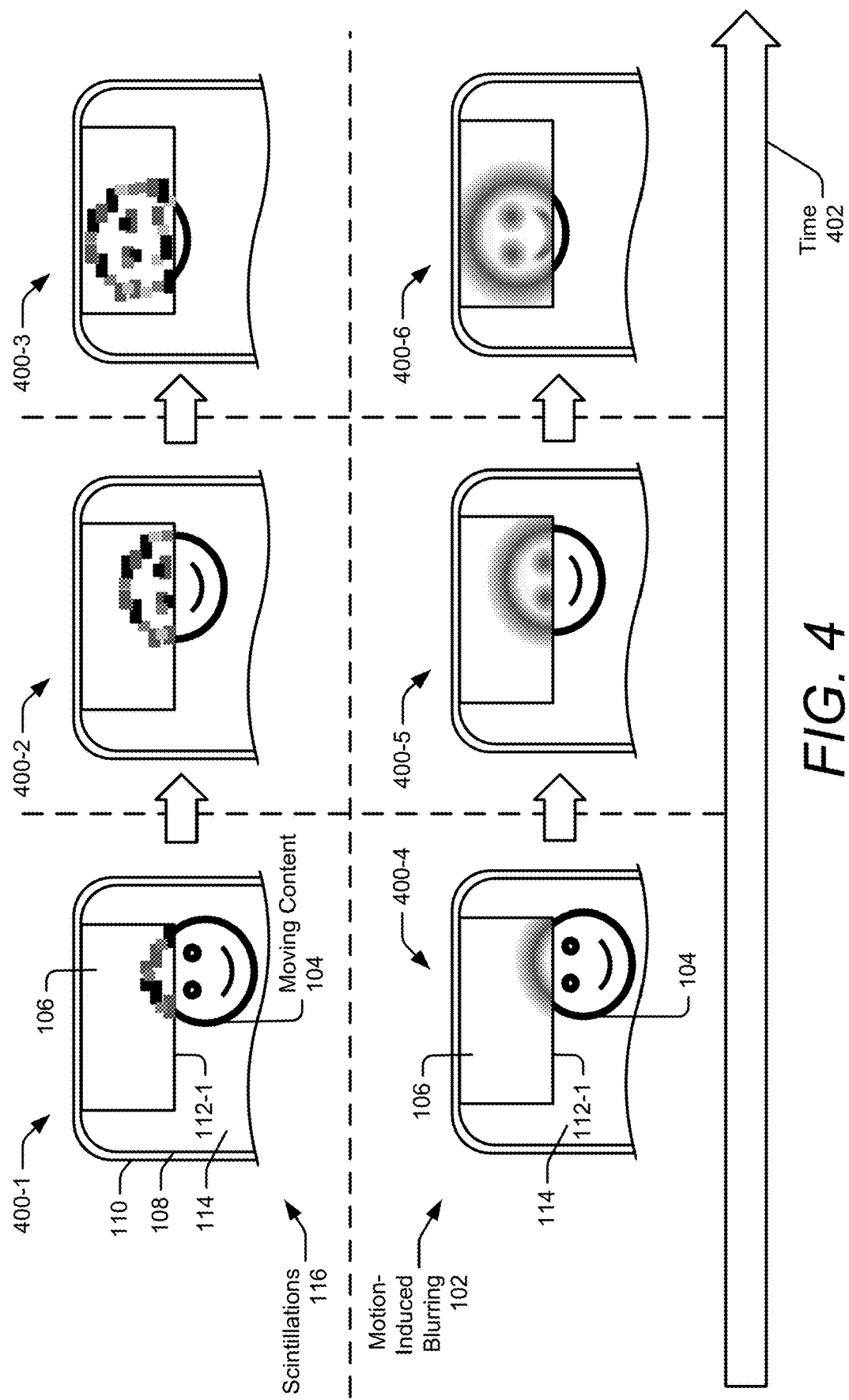
FIG. 4 illustrates an example sequence flow diagram of scintillations and motion-induced blurring of the moving content over time.

FIG. 4 illustrates an example sequence flow diagram of scintillations 116 and motion-induced blurring 102 of the moving content 104 over time 402. The moving content 104 is moving from the first region 114 to the second region 106 and over the boundary 112-1 as time 402 progresses from left to right. In example environments 400-1, 400-2, and 400-3, the moving content 104 appears pixelated and causes scintillations 116 within the second region 106 due to the speed of the moving content 104 and the second resolution, which is lower than the resolution threshold. To reduce these scintillations 116 within the second region 106, the blurring module 208 signals a processor to apply the motion-induced blurring 102 to the moving content 104 before being displayed (e.g., to each consecutive image to be displayed over time 402), as depicted in example environments 400-4, 400-5, and 400-6. In this example, the blurring module 208 refrains from signaling a processor to apply the motion-induced blurring 102 to the moving content 104 within the first region 114 because the first resolution is greater than the resolution threshold.

To apply the motion-induced blurring 102, the blurring module 208 first detects a speed of the moving content 104. The speed refers to a speed at which the content would change or move when later displayed on the display 108 of the computing device 110. For example, the speed in FIG. 4 correlates with a changing position of the moving content 104 over time 402 (e.g., 400-1, 400-2, and 400-3). The moving content 104 moves upwards on the display 108 due to the speed native of the content.

The blurring module 208 can refrain from signaling a processor to apply the motion-induced blurring 102 unless the speed of the moving content 104 exceeds a minimum speed threshold (e.g., a minimum speed required to apply the motion-induced blurring 102). Furthermore, the minimum speed threshold corresponds to a minimum speed required of the moving content 104 for scintillations 116 to become apparent to the user. For example, scintillations 116 are not apparent if the moving content 104 is stationary. Reference may be made herein to a minimum speed threshold, which can also include a minimum rate (e.g., change measured over time), minimum velocity, and minimum acceleration required to apply the motion-induced blurring 102. The minimum speed threshold may also include instantaneous speeds, velocities, accelerations, and rates of the moving content and speeds, velocities, accelerations, and rates that are averaged over a duration of time. However, the scintillations 116 become apparent as the speed of the moving content 104 increases (e.g., for an action movie).

In another example, the minimum speed threshold is based on a rate of 10 hertz (Hz), and the moving content 104 is changing within the second region 106 at a speed of 9 Hz. The blurring module 208 receives input of this speed of 9 Hz and compares it to the minimum speed threshold of 10 Hz. Since this speed is lower than the minimum speed threshold, the blurring module 208 refrains from signaling a processor to blur the moving content 104 and, instead, signals a processor to display the moving content 104 normally (e.g., without the motion-induced blurring 102 applied). The minimum speed threshold prevents slow-moving content (e.g., content moving at a speed below the minimum speed threshold) and stationary content from being blurred. In these situations, the user may prefer pixelated content over blurred content. If instead, the speed of the moving content 104 is 11 Hz, then the blurring module 208 receives input of this speed of 11 Hz and compares it to the minimum speed threshold of 10 Hz. Since this speed of 11 Hz is greater than the minimum speed threshold, the motion-induced blurring 102 is applied to the moving content 104 within the second region 106. An amount of motion-induced blurring 102 applied to the moving content 104 can be adjusted based on the speed using the blur control 210 as further described in FIG. 5.

Figure 5:
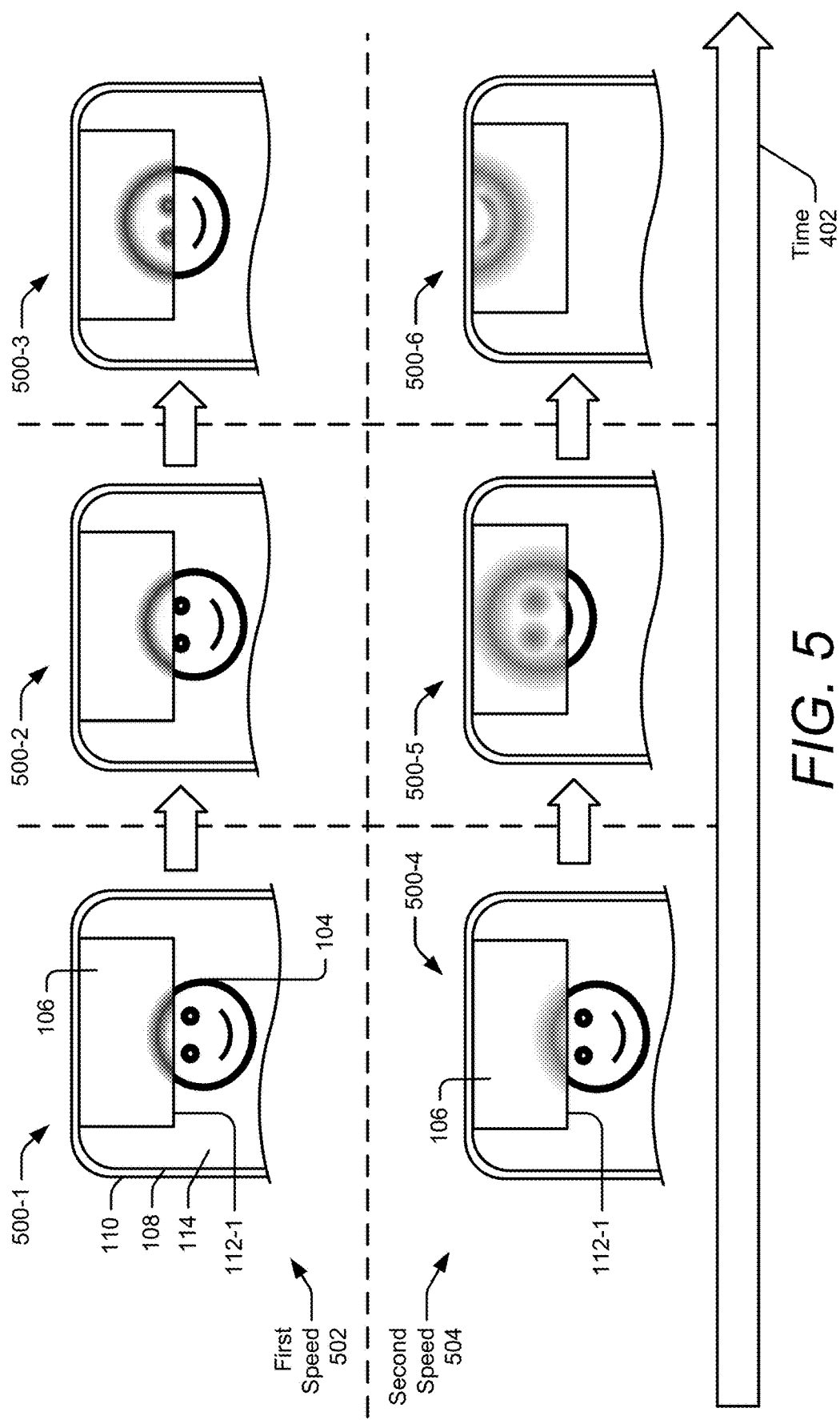
FIG. 5 illustrates two example techniques of motion-induced blurring of the moving content based on the speed.

FIG. 5 illustrates two example techniques of motion-induced blurring 102 of the moving content 104 based on the speed. If the speed is greater than the minimum speed threshold, then the moving content 104 can be blurred by an amount associated with the speed using the blur control 210. As the speed of the moving content 104 increases, an amount of motion-induced blurring 102 applied to the moving content 104 can increase to reduce scintillations 116 and an appearance of the boundary 112-1 separating the first region 114 and the second region 106. Similarly, as the speed of the moving content 104 decreases, an amount of motion-induced blurring 102 applied to the moving content 104 can decrease.

In FIG. 5, the moving content 104 is moving upwards within the display 108 over time 402, from the first region 114 to the second region 106 and over the boundary 112-1. Example environments 500-1, 500-2, and 500-3 depict a first speed 502, and example environments 500-4, 500-5, and 500-6 depict a second speed 504. The first speed 502 is depicted slower than the second speed 504. Therefore, the moving content 104 in the example environments 500-1, 500-2, and 500-3 is blurred less than the moving content 104 in the example environments 500-4, 500-5, and 500-6. The amount of motion-induced blurring 102 applied to the moving content 104 can be linearly or nonlinearly correlated with the speed of the moving content 104. For example, the amount of blurring can relate to the speed proportionally, with an optional offset included. Alternatively, the amount of blurring can relate to the speed using a nonlinear function, operation, or set of operations.

The blur control 210 can fix the amount of motion-induced blurring 102 at a constant amount (e.g., a static value) if the speed increases above a maximum speed threshold (e.g., a maximum speed permitted by the blurring module 208). If the blurring module 208 receives input of the speed of the moving content 104 and determines that it is greater than the maximum speed threshold, then a constant amount of the motion-induced blurring 102 is applied to the moving content 104. Reference may be made herein to a maximum speed threshold, which can also include a maximum rate (e.g., change measured over time), maximum velocity, and maximum acceleration permitted by the blurring module 208. The maximum speed threshold may also include instantaneous speeds, velocities, accelerations, and rates of the moving content and speeds, velocities, accelerations, and rates that are averaged over a duration of time. For example, if the maximum speed threshold is set based on a rate of 50 Hz and the moving content 104 includes a speed of 60 Hz (e.g., rate to be displayed), the amount of motion-induced blurring 102 applied will be held at a constant amount associated with the maximum speed threshold of 50 Hz. In this example, if the speed increases above 60 Hz or decreases below 60 Hz but still above 50 Hz, the amount of motion-induced blurring 102 applied to the moving content 104 will remain constant.

The moving content 104 contains a plurality of images that are consecutively received by the computing device 110 over time 402 before being displayed consecutively on the display 108. For example, environments 500-1, 500-2, and 500-3 represent three consecutive images of the moving content 104. The content source can configure the consecutive images to be displayed at a specific speed (e.g., a source speed). Reference may be made herein to a source speed, which can also include a source rate (e.g., change measured over time), source velocity, and source acceleration. The source speed may also include instantaneous speeds, velocities, accelerations, and rates as configured by the content source and speeds, velocities, accelerations, and rates that are averaged over a duration of time.

The speed of the moving content 104 can be received by the blurring module 208 based on changes that occur between consecutive images received from the content source. These changes include, for example, a change in color, position, or size of the moving content 104 based on the source speed. The blur control 210 can change the amount of motion-induced blurring 102 applied to the moving content 104 based on the speed. As the moving content 104 changes more often, the amount of blurring can increase. As the moving content 104 changes less often, the amount of blurring can decrease.

In an example, if the user is watching a video on the display 108 that depicts a landscape changing slowly (e.g., changing less often over time 402), the amount of motion-induced blurring 102 applied can decrease to accommodate the slow speed (e.g., reduced changes) associated with the landscape. However, if the video later features a high-speed car chase with fast changes (e.g., occurring more often over time 402), the amount of motion-induced blurring 102 applied can increase to accommodate the fast speed (e.g., increased changes) associated with the high-speed car chase.

The speed of the moving content 104 can be additionally associated with the source speed as configured by the content source. As the source speed increases, the speed and an amount of motion-induced blurring 102 applied to the moving content 104 can increase to reduce scintillations 116. As the source speed decreases, the speed can decrease along with an amount of motion-induced blurring 102 applied. Additional techniques for determining the speed of the moving content 104 are further discussed with respect to FIGS. 6-1 and 6-2. Any of the techniques described herein may be used, and in any combination, to determine if the techniques of motion-induced blurring 102 are required within a region to improve the user experience.

Figures 1, 6:
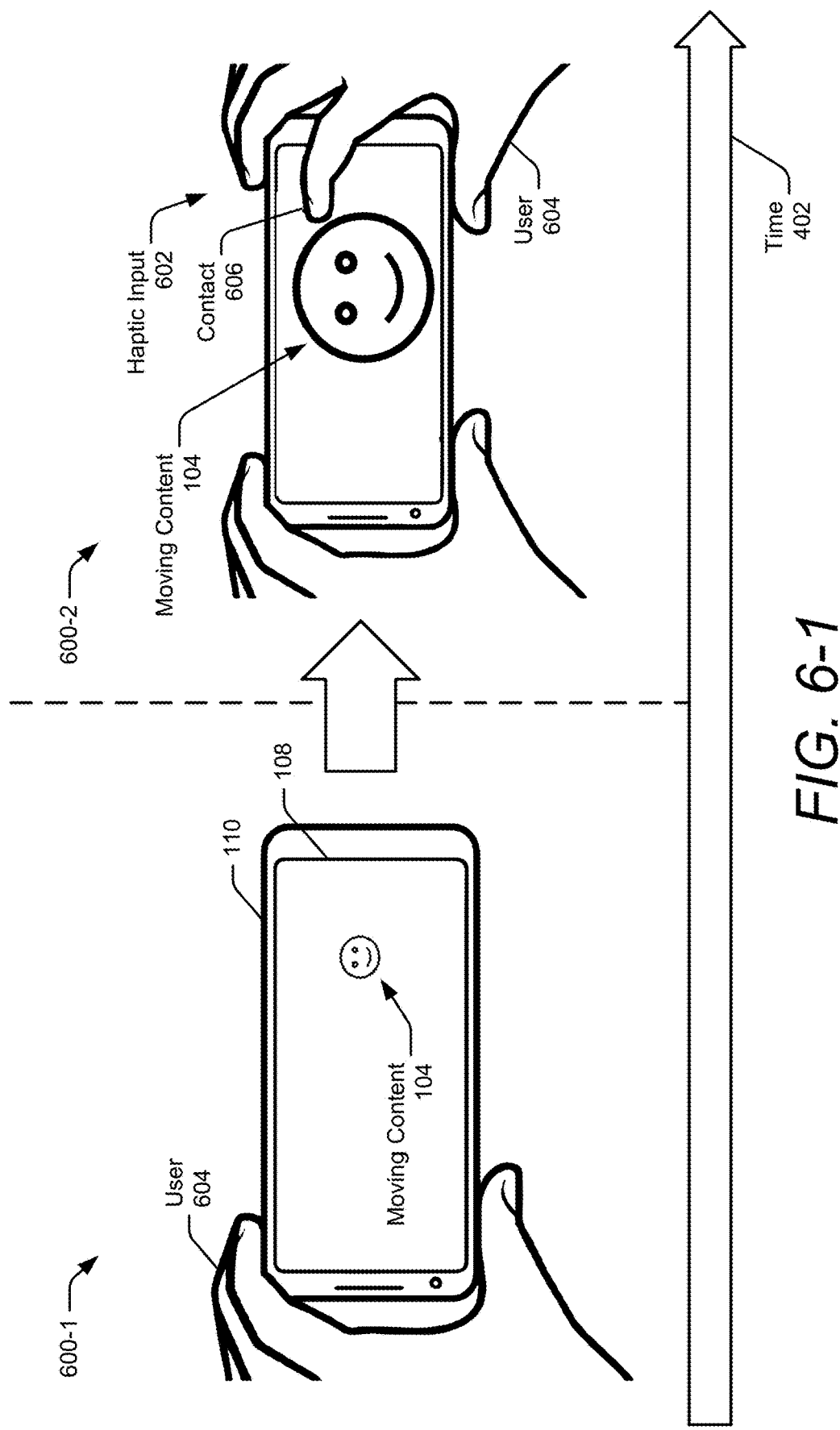
Figures 2, 6:
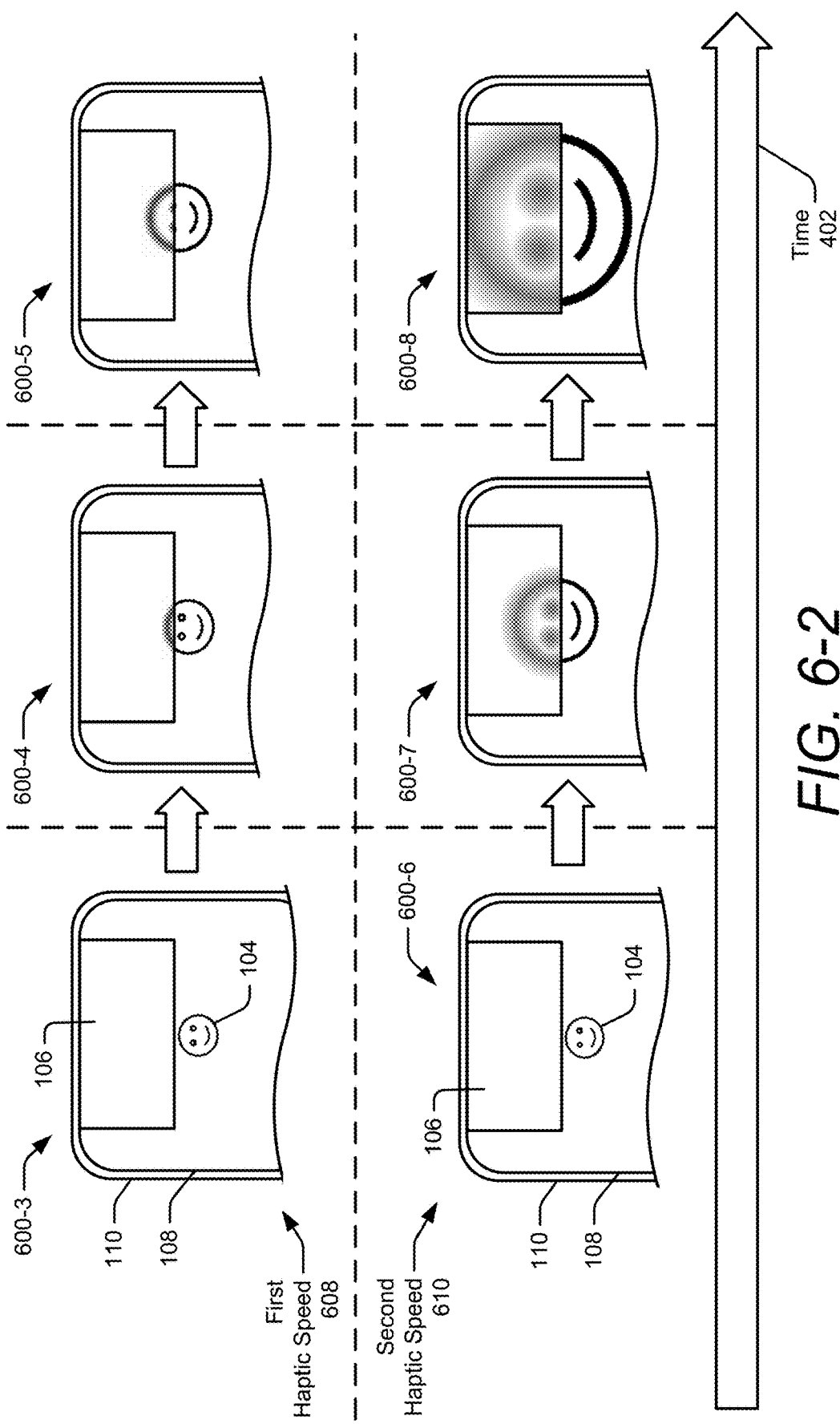

FIG. 6-1 illustrates an example haptic input 602 from a user 604 that changes a size and/or position of the moving content 104. The haptic input 602 is performed by the user 604 making a contact 606 with the display 108. The contact 606 can include a touch, a swipe, a pinch, a flick, a tap, a scroll, and so forth using one or more fingers of the user 604. In example environments 600-1 and 600-2, the moving content 104 is enlarged on the display 108 using a contact 606 (e.g., a pinch touch) of the user 604. The computing device 110 can include a touch sensor 218 (e.g., a capacitive touch sensor, a resistive touch sensor, surface acoustic wave (SAW) technology, an infrared touch sensor, and so forth) configured to enable detection of the haptic input 602.

A speed associated with the contact 606 (e.g., a haptic speed) of the haptic input 602 can be received by the blurring module 208. The haptic speed of the haptic input 602 can influence an amount of the motion-induced blurring 102 applied to the moving content 104 as depicted in FIG. 6-2. As the haptic speed increases, the speed of the moving content 104 and the amount of motion-induced blurring 102 applied to the moving content 104 can increase. As the haptic speed decreases, the speed of the moving content 104 and the amount of motion-induced blurring 102 applied can decrease. Reference may be made herein to a haptic speed which can also include a haptic rate (e.g., change measured over time due to the haptic input 602), haptic velocity, and haptic acceleration. The haptic speed may also include instantaneous speeds, velocities, accelerations, and rates of the haptic input 602 and speeds, velocities, accelerations, and rates that are averaged over a duration of time.

FIG. 6-2 illustrates two examples of the blurring module 208 signaling a processor to apply the motion-induced blurring 102 to the moving content 104 based on the haptic speed. In these examples, the user 604 is changing a size of the moving content 104 (e.g., enlarging the size) at different haptic speeds using a pinch contact. A first haptic speed 608 associated with example environments 600-3, 600-4, and 600-5 is slower than a second haptic speed 610 associated with example environments 600-6, 600-7, and 600-8. A greater amount of the motion-induced blurring 102 is applied to example environments 600-6, 600-7, and 600-8 than example environments 600-3, 600-4, and 600-5, because the second haptic speed 610 is faster than the first haptic speed 608.

The blurring module 208 can additionally receive a refresh speed that sets a limit on how fast consecutive images of the moving content 104 can be displayed. In this case, the maximum speed threshold can be set at the refresh speed. Reference may be made herein to a refresh speed, which can also include a refresh rate (e.g., change measured over time), refresh velocity, and refresh acceleration. The refresh speed may also include instantaneous speeds, velocities, accelerations, and rates at which content is refreshed and speeds, velocities, accelerations, and rates that are averaged over a duration of time.

For example, if the refresh speed is based on a rate of 90 Hz, then the maximum speed threshold is set at 90 Hz. If the haptic speed is based on a rate of 120 Hz (e.g., due to a fast swipe or fast scroll input), the amount of motion-induced blurring 102 applied to the moving content 104 can be fixed at a constant amount associated with 90 Hz by the blur control 210. If the source speed is based on a rate of 100 Hz (e.g., due to a fast video), the amount of motion-induced blurring 102 applied to the moving content 104 can again be fixed at the constant amount associated with 90 Hz by the blur control 210.

The blur control 210 can additionally include a smoothing filter. For example, the smoothing filter can include a bilateral filter (e.g., a nonlinear filter) used to smooth a profile of the moving content 104. In this example, the bilateral filter can replace a pixel intensity associated with each distinct pixel of the pixel layer 304 with an average of nearby pixel intensities. The smoothing filter can also include a Gaussian blur, nonlinear filters, wavelet transformations, statistical methods, block-matching algorithms, and so forth. The smoothing filter can utilize an ML model, for example, to adjust the blur control 210 based on a history of the moving content 104 to improve a user experience.

Figure 7:
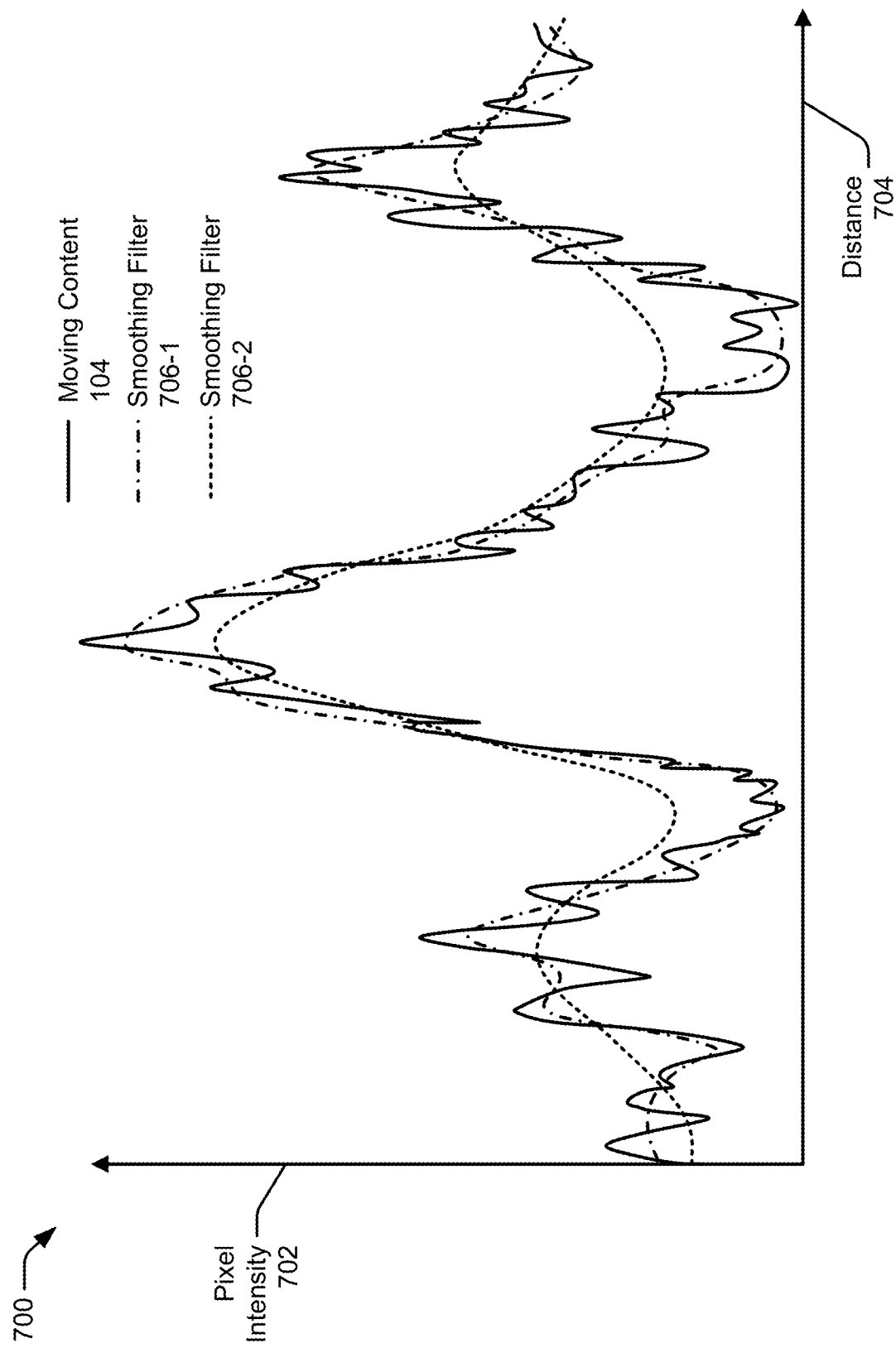
FIG. 7 illustrates an example plot of how a pixel intensity profile of the moving content is modified by the smoothing filter.

FIG. 7 illustrates an example plot of how a pixel intensity 702 profile of the moving content 104 is modified by the smoothing filter. In this example, the pixel intensity 702 associated with the moving content 104 varies over a distance 704 (e.g., across the second region 106 of the display 108). The pixel intensity 702 of the moving content 104 appears more chaotic and less smooth over the distance 704 due to scintillations 116.

The smoothing filter can smooth (e.g., average) the pixel intensity 702 of the moving content 104 using a weight. The weight can represent a numerical value or function that changes depending on the speed of the moving content 104. As the speed increases, the numerical value or function of the weight changes to increase the amount of motion-induced blurring 102 applied to the moving content 104. As the speed decreases, the numerical value or function of the weight changes to decrease the amount of motion-induced blurring 102.

In the example plot 700, two distinct smoothing filters 706-1 and 706-2 are applied to the moving content 104. The smoothing filter 706-2 uses a different weight from the smoothing filter 706-1 to increase an amount of the motion-induced blurring 102 applied to the moving content 104. The pixel intensity 702 associated with the smoothing filter 706-2 is smoother over distance 704, representing an increase in the averaging of nearby pixel intensities (e.g., over a larger distance 704), than the smoothing filter 706-1. Further variations of the techniques of motion-induced blurring 102 are described with respect to FIG. 8.

Figure 8:
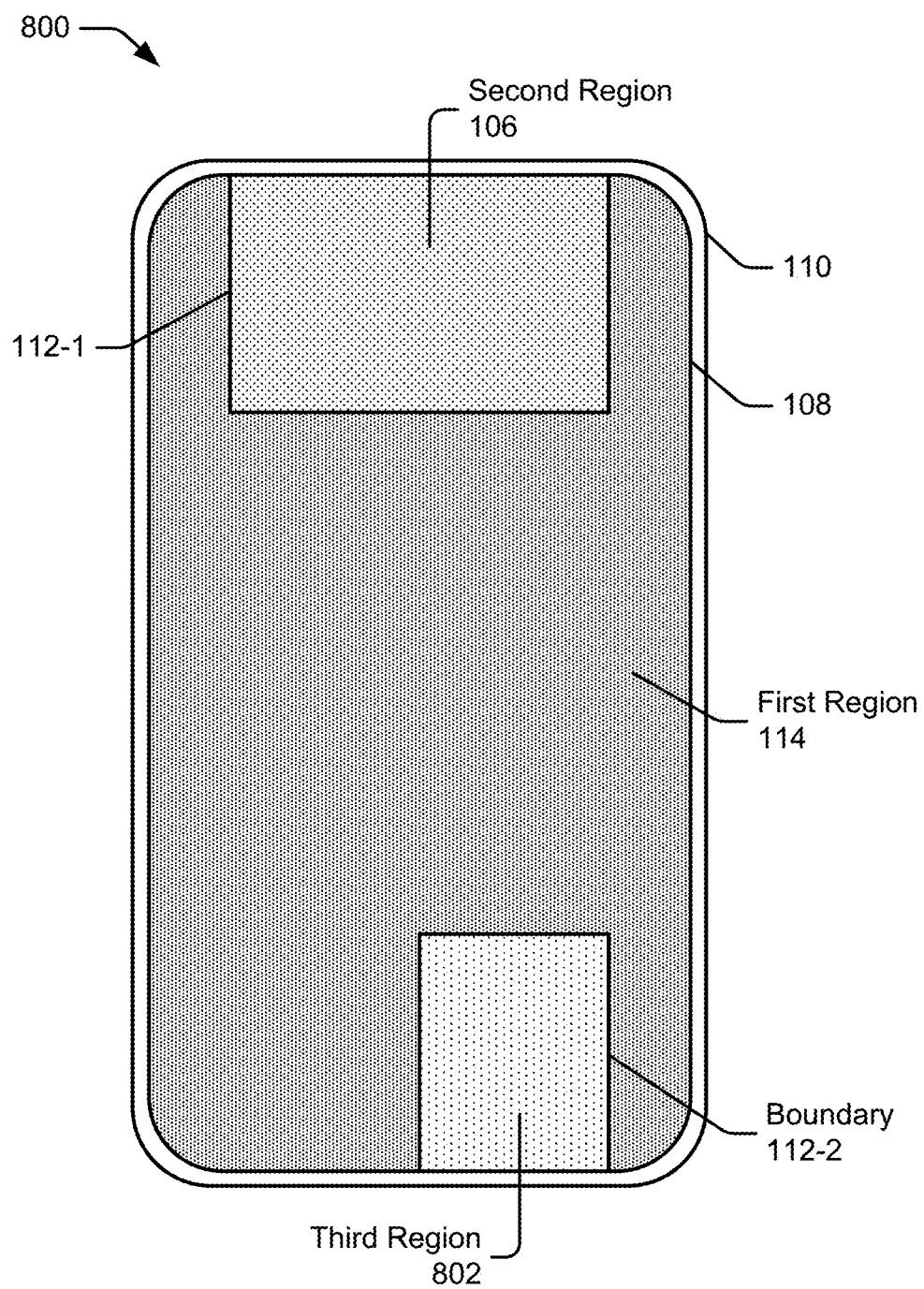
FIG. 8 illustrates an example computing device that includes a first, second, and third region of the display.

FIG. 8 illustrates an example computing device 110 that includes the first region 114, the second region 106, and a third region 802 of the display 108. The third region 802 includes a third resolution (e.g., a third pixel-density) that is either different from or similar to another region. The third region 802 can also include one or more sensors 216 placed at least partially underneath the display 108 and within the third region 802. The size, shape, and position of the third region 802 can vary within the display 108.

Similar to techniques performed within the second region 106, the blurring module 208 can signal a processor to apply the motion-induced blurring 102 within the third region 802 based on the speed of the moving content 104 to reduce scintillations of the moving content 104 within the third region 802 and the appearance of the boundary 112-2 separating the third region 802 from the first region 114, relative to an appearance of the boundary 112-2 when the blurring module 208 refrains from signaling a processor to blur the moving content 104. An appearance of the boundary 112-2 separating the third region 802 from the second region 106 (not depicted) can also be reduced using the blurring module 208. The speed of the moving content 104 in third region 802 can be different from, or similar to, the speed within the second region 106 and first region 114. Furthermore, the amount of blurring in the third region 802 can be different from, or similar to, any other region of the display 108.

Example Methods

Figure 9:
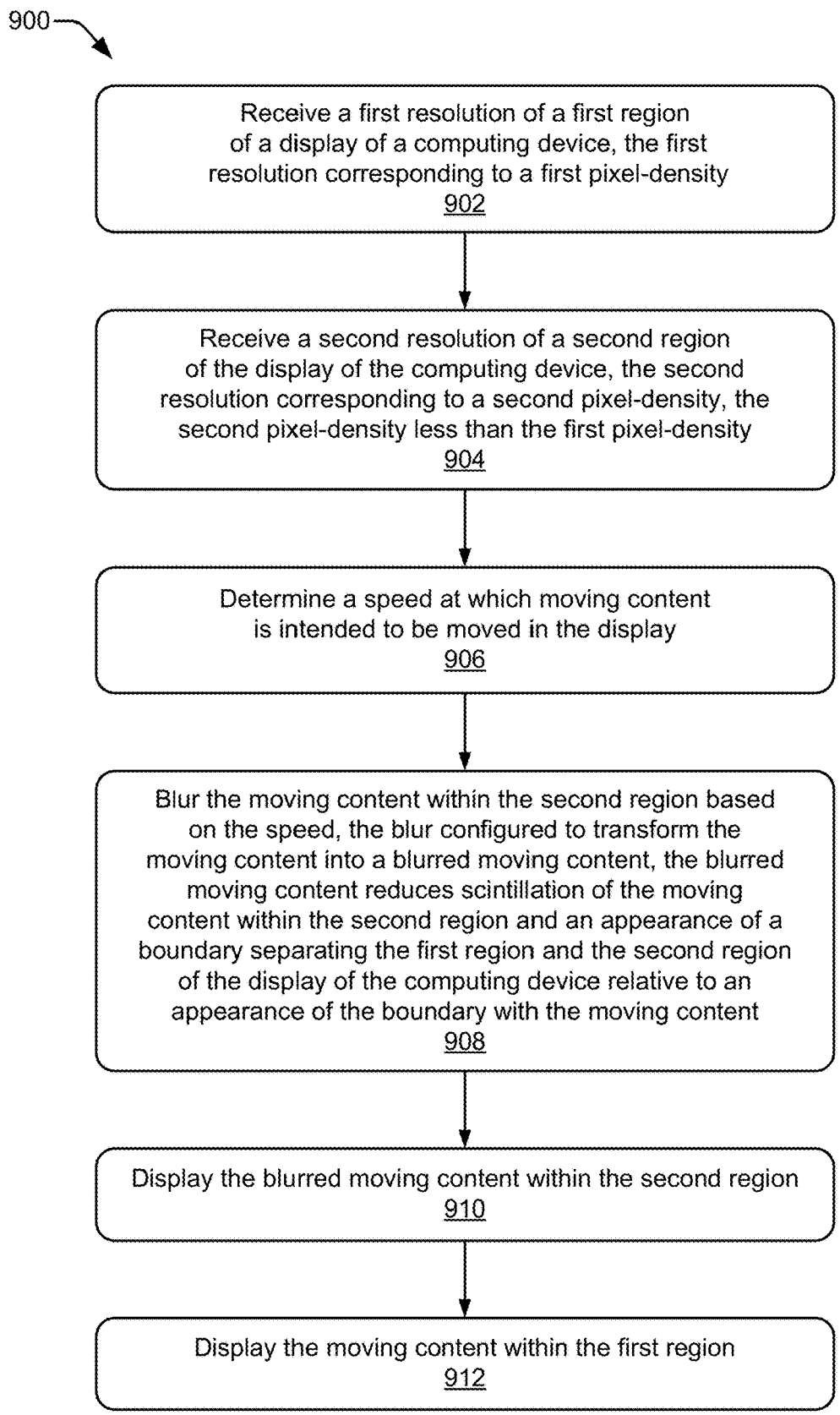
FIG. 9 illustrates an example method for motion-induced blurring to reduce scintillations and an appearance of a boundary separating regions of a display.

FIG. 9 depicts an example method 900 for motion-induced blurring to reduce scintillations and an appearance of a boundary separating regions of a display. Method 900 is shown as sets of operations (or acts) performed and is not necessarily limited to the order or combinations in which the operations are shown herein. Furthermore, any of one or more of the operations can be repeated, combined, reorganized, or linked to provide a wide array of additional and/or alternative methods. In portions of the following discussion, reference may be made to environments and entities detailed in FIGS. 1-8, reference to which is made for example only. The techniques are not limited to performance by one entity or multiple entities operating on one computing device 110.

At 902, a first resolution of a first region of a display of the computing device is received, where the first resolution corresponds to a first pixel-density. For example, the blurring module 208 receives the first resolution of the first region 114 of the display 108, and the first resolution corresponds to the first pixel-density 306, as shown in FIGS. 1, 3, and 8. The size, shape, and location of the first region 114 can vary.

At 904, a second resolution of a second region of the display of the computing device is received. The second resolution corresponds to a second pixel-density and the second pixel-density is lower than the first pixel-density. For example, the blurring module 208 receives the second resolution of the second region 106 of the display 108. The second resolution corresponds to the second pixel-density 308 and is lower than the first pixel-density 306.

At 906, a speed at which moving content is intended to be moved in the display is determined. For example, a speed at which the moving content 104 is intended to be moved in the display 108 is received by the blurring module 208, as illustrated in FIG. 4.

At 908, the moving content is blurred within the second region based on the speed of the moving content to transform the moving content into a blurred moving content. The blurred moving content is configured to reduce scintillation of the moving content within the second region and an appearance of a boundary separating the first region and the second region of the display of the computing device relative to an appearance of the boundary with the moving content. For example, the moving content 104 within the second region 106 is blurred using the blurring module 208 to transform the moving content 104 into a blurred moving content by applying the motion-induced blurring 102 to the moving content 104 as illustrated in FIGS. 1 and 4. The motion-induced blurring 102 is applied to the moving content 104 based on the speed to produce the blurred moving content, as illustrated in FIGS. 5 and 6-2. Scintillations 116 of the moving content 104 are reduced within the second region 106. An appearance of the boundary 112-1 separating the first region 114 and the second region 106 of the display 108 of the computing device 110 is reduced, relative to an appearance of the boundary 112-1 when the blurring module 208 refrains from signaling a processor to blur and, instead, signals a processor to display the moving content 104 normally.

At 910, the blurred moving content is displayed within the second region. For example, the moving content 104, with the motion-induced blurring 102 applied, is displayed within the second region 106 as shown in environment 100-2 of FIG. 1.

At 912, the moving content is displayed within the first region. For example, the moving content 104, without the motion-induced blurring 102 applied, is displayed within the first region 114 as shown in environment 100-1 of FIG. 1.

Example Computing Systems

Figure 10:
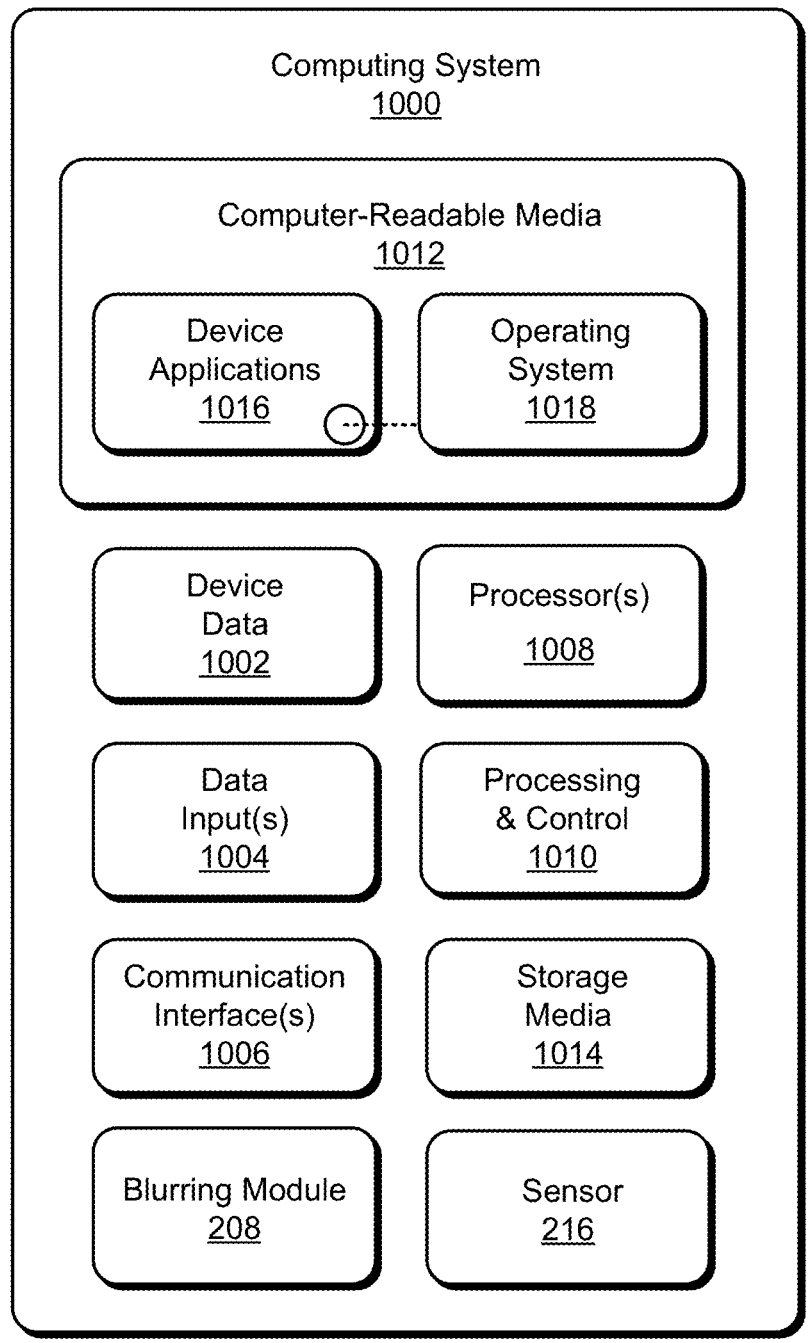
FIG. 10 illustrates an example computing system embodying, or in which techniques can be implemented that enable use of, the techniques of motion-induced blurring to reduce scintillations and the appearance of the boundary separating regions of the display.

FIG. 10 illustrates an example computing system 1000 embodying, or in which techniques can be implemented that enable use of, the techniques of motion-induced blurring 102 to reduce scintillations 116 and the appearance of the boundary 112-1 (or 112-2) separating regions of the display 108. The example computing system 1000 can be implemented as any type of client, server, and/or computing device as described with reference to FIG. 2.

The computing system 1000 can include device data 1002 (e.g., received data, data that is being received, data scheduled for broadcast, or data packets of the data), the blurring module 208, and one or more sensors 216. The device data 1002 or other device content can include configuration settings of the device, media content stored on the device, and/or information associated with the user 604 of the device. Media content stored on the computing system 1000 can include any type of audio, video, and/or image data. The computing system 1000 can include one or more data inputs 1004 by which any type of data, media content, and/or inputs can be received, including contacts 606 associated with the haptic input 602, user-selectable inputs (explicit or implicit), messages, music, television media content, recorded video content, and any other type of audio, video, and/or image data received from any content and/or data source.

The computing system 1000 can also include communication interfaces 1006, which can be implemented as any one or more of a serial and/or parallel interface, a wireless interface, any type of network interface, a modem, and any other type of communication interface. The communication interfaces 1006 provide a connection and/or communication links between the computing system 1000 and a communication network by which other electronic, computing, and communication devices communicate data with the computing system 1000.

The computing system 1000 can include one or more processors 1008 (e.g., any of microprocessors, controllers, and the like), which process various computer-executable instructions to control the operation of the computing system 1000 and to enable techniques for, or in which can be embodied, the motion-induced blurring 102. Alternatively or in addition, the computing system 1000 can be implemented with any one or combination of hardware, firmware, or fixed logic circuitry that is implemented in connection with processing and control circuits, which are generally identified at 1010. Although not shown, the computing system 1000 can include a system bus or data transfer system that couples the various components within the device. A system bus can include any one or combination of different bus structures, including a memory bus or memory controller, a peripheral bus, a universal serial bus, and/or a processor or local bus that utilizes any of a variety of bus architectures.

The computing system 1000 can additionally include computer-readable media 1012, including one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, and so forth), and a disk storage device. The disk storage device can be implemented as any type of magnetic or optical storage device, including a hard disk drive, a recordable and/or rewriteable compact disc (CD), any type of a digital versatile disc (DVD), and the like. The computing system 1000 can also include a mass storage media device (storage media) 1014.

The computer-readable media 1012 provides data storage mechanisms to store the device data 1002, as well as various device applications 1016 and any other types of information and/or data related to operational aspects of the computing system 1000. For example, an operating system 1018 is maintained as a computer application with the computer-readable media 1012 and executed on the processors 1008. The device applications 1016 can include a device manager, including any form of a control application, software application, signal-processing and control module, code that is native to a particular device, a hardware abstraction layer for a particular device, and so on. Using the blurring module 208, the computing system 1000 can reduce scintillations 116 of moving content 104 and the appearance of the boundary 112-1 (or 112-2) separating regions of the display 108 of the computing device 110.

Conclusion

Although techniques and apparatuses for reducing scintillations and an appearance of a boundary separating regions of a display have been described in language specific to features and/or methods, it is to be understood that the subject of the appended claims is not necessarily limited to the specific features or methods described. Rather, the specific features and methods are disclosed as example implementations of motion-induced blurring capable of reducing scintillations and an appearance of a boundary separating regions of a display.

Some Examples are described below.

Example 1: A method for motion-induced blurring comprising: receiving a first resolution of a first region of a display of a computing device, the first resolution corresponding to a first pixel-density; receiving a second resolution of a second region of the display of the computing device, the second resolution corresponding to a second pixel-density, the second pixel-density lower than the first pixel-density; determining a speed of content to be moved in the display, a moving content moving at the speed within the second region; blurring the moving content within the second region based on the speed, the blurring configured to transform the moving content into a blurred moving content, the blurred moving content reducing scintillation of the moving content within the second region and an appearance of a boundary separating the first region and the second region of the display of the computing device relative to an appearance of the boundary with the moving content; displaying the blurred moving content within the second region; and displaying the moving content within the first region.

Example 2: The method as recited by example 1, wherein the method for motion-induced blurring of the moving content on the display further comprises: receiving a source resolution of the moving content as configured by a content source, wherein the content source supplies the moving content to the display; comparing the source resolution and the first resolution; responsive to the source resolution different from the first resolution, resampling the moving content within the first region based on the first resolution prior to displaying the moving content within the first region, the resampling configured to change the moving content from the source resolution to the first resolution; comparing the source resolution and the second resolution; and responsive to the source resolution different from the second resolution, resampling the blurred moving content within the second region based on the second resolution prior to displaying the blurred moving content within the second region, the resampling further configured to change the blurred moving content from the source resolution to the second resolution.

Example 3: The method as recited by examples 1 or 2, wherein the method for motion-induced blurring of the moving content further comprises: comparing the second resolution to a resolution threshold, the resolution threshold comprising a minimum resolution required to prevent scintillation of the moving content, the minimum resolution comprising a minimum pixel-density; responsive to the second resolution lower than the resolution threshold, blurring the moving content within the second region; comparing the first resolution to the resolution threshold; and responsive to the first resolution greater than the resolution threshold, displaying the moving content within the first region.

Example 4: The method as recited by example 3, wherein the first resolution of the first region of the display is greater than the resolution threshold and the second resolution of the second region of the display is lower than the resolution threshold.

Example 5: The method as recited by example 3, wherein the method for motion-induced blurring of the moving content further comprises: determining the second resolution lower than the resolution threshold; comparing the speed of the moving content within the second region to a minimum speed threshold, the minimum speed threshold corresponding to a minimum speed required of the moving content for scintillations; responsive to determining the speed of the moving content within the second region greater than the minimum speed threshold, blurring the moving content within the second region; displaying the blurred moving content within the second region of the display; and responsive to determining the speed of the moving content within the second region lower than the minimum speed threshold, displaying the moving content within the second region of the display.

Example 6: The method as recited by example 5, wherein the method for motion-induced blurring of the moving content further comprises: determining the speed of the moving content within the second region of the display greater than the minimum speed threshold; and blurring the moving content within the second region, wherein the blurring of the moving content further comprises increasing an amount of the blurring as the speed of the moving content increases and decreasing the amount of the blurring as the speed of the moving content decreases.

Example 7: The method as recited by example 6, wherein the amount of the blurring of the moving content may include one or more of the following: a linear correlation between the amount of the blurring and the speed of the moving content, wherein an increase in the speed corresponds linearly with the amount of the blurring; and a nonlinear correlation between the amount of the blurring and the speed of the moving content, wherein an increase in the speed corresponds nonlinearly with the amount of the blurring.

Example 8: The method as recited by example 6, wherein the method for motion-induced blurring of the moving content further comprises: comparing the speed of the moving content within the second region to a maximum speed threshold, the maximum speed threshold corresponding to a maximum speed of the moving content permitted to be displayed on the computing device; and responsive to detecting the speed greater than the maximum speed threshold, blurring the moving content by a constant amount of the blurring, the constant amount of the blurring configured at a static value and maintained at the static value as the speed increases and decreases above the maximum speed threshold.

Example 9: The method as recited by any preceding example, wherein the determining of the speed of the moving content further comprises: receiving a source speed of the moving content, wherein: the moving content comprises a plurality of images consecutively received on the computing device over time; the source speed corresponds to a speed of consecutively received images over time as configured by the content source; detecting changes of the moving content between the consecutively received images based on the source speed, wherein the changes include one or more of the following at any distinct location of the moving content: a change in a color of the moving content; a change in a position of the moving content; or a change in a size of the moving content; detecting an increase in the speed as the changes of the moving content increase between the consecutively received images; and detecting a decrease in the speed as the changes of the moving content decrease between the consecutively received images.

Example 10: The method as recited by example 9, wherein: the speed of the moving content is set by the source speed as configured by the content source; the speed of the moving content increases as the source speed increases and the speed of the moving content decreases as the source speed decreases; and the amount of the blurring increases as the source speed increases and the amount of the blurring decreases as the source speed decreases.

Example 11: The method as recited by any preceding example, wherein the determining of the speed of the moving content further comprises: receiving a haptic input on the display of the computing device, the haptic input performed by a user making a contact with the display, the contact made on the display to change a size or position of the moving content; detecting a haptic speed associated with the haptic input; detecting an increase in the speed of the moving content as the haptic speed increases; and detecting a decrease in the speed of the moving content as the haptic speed decreases.

Example 12: The method as recited by examples 8-11, wherein the method for motion-induced blurring of the moving content on the display further comprises: detecting a refresh speed of the display, the refresh speed including a maximum refresh speed, the plurality of images of the moving content and a plurality of images of the blurred moving content consecutively displayed on the display based on the maximum refresh speed; and setting the maximum speed threshold at the refresh speed, the maximum speed threshold further configured to enable blurring of the moving content within the second region by the constant amount of the blurring responsive to detecting one or more of the following: the haptic speed greater than the refresh speed; or the source speed greater than the refresh speed.

Example 13: The method as recited by any preceding example, wherein: the display comprises a pixel layer, the pixel layer includes: the first pixel-density; the second pixel-density; and color pixels configured to display the moving content in color; a density of color pixels is correlated with a resolution of a region of the display; color defects are associated with the density of color pixels, the color defects including color distortions and scintillations of the moving content, the color defects configured to increase the appearance of scintillations within the second region and the boundary separating the first region and the second region; and responsive to determining the second resolution lower than the resolution threshold, the density of color pixels lower than the minimum pixel-density, blurring the moving content within the second region to reduce the color defects.

Example 14: The method as recited by any preceding example, wherein the display further comprises an array of pixels configured to display the moving content, the array of pixels comprising a pixel intensity for each pixel of the array, and the blurring of the moving content within the second region of the display further comprises a smoothing filter, the smoothing filter configured to replace the pixel intensity for each pixel with an average of the pixel intensities of nearby pixels within the second region to blur the moving content.

Example 15: The method as recited by example 14, wherein the smoothing filter further comprises a weight, the weight correlated with the speed of the moving content and configured to increase the amount of the blurring as the speed increases and decrease the amount of blurring as the speed decreases.

Example 16: The method as recited by any preceding example, wherein a processor of the computing device is configured to blur the moving content within the second region, the processor comprises one or more of the following: a central processing unit (CPU); a data processing unit (DPU); or a graphics processing unit (GPU).

Example 17: The method as recited by any preceding example, wherein the method for motion-induced blurring of the moving content further comprises: receiving a third resolution of a third region of the display of the computing device, the third resolution corresponding to a third pixel-density, the third pixel-density lower than the first pixel-density; determining the speed of content to be moved in the display, the moving content moving at the speed within the third region; blurring the moving content within the third region based on the speed, the blurring configured to transform the moving content into the blurred moving content, the blurred moving content reducing scintillations within the third region and an appearance of a boundary separating the first region and the third region of the display of the computing device relative to an appearance of the boundary with the moving content; and displaying the blurred moving content within the third region.

Example 18: The method as recited by example 17, wherein the method for motion-induced blurring of the moving content further comprises displaying the blurred moving content within the second region and the third region to reduce an appearance of a boundary separating the second region and third region of the display of the computing device.

Example 19: A computing device comprising: at least one processor; a display comprising an array of pixels, the array of pixels configured to enable a moving content to be viewed on the display; and computer-readable storage media comprising instructions, responsive to execution by the processor, for directing the computing device to perform any one of the methods recited in examples 1 to 18 using the display.

Example 20: The computing device as recited by example 19, further comprising one or more of the following: a first sensor positioned at least partially underneath a second region of the display, the second region comprising a second pixel-density lower than a minimum pixel-density, the minimum pixel-density corresponding to a resolution threshold, the second pixel-density configured to enable operations of the first sensor; or a second sensor positioned at least partially underneath a third region of the display, the third region comprising a third pixel-density lower than the minimum pixel-density, the third pixel-density configured to enable operations of the second sensor.

What is claimed is:

1. A method for motion-induced blurring comprising:
receiving a first resolution of a first region of a display of a computing device, the first resolution corresponding to a first pixel-density;
receiving a second resolution of a second region of the display of the computing device, the second resolution corresponding to a second pixel-density, the second pixel-density lower than the first pixel-density;
determining a speed at which moving content is intended to be moved in the display;
blurring a moving content within the second region based on the speed, the blurring configured to transform the moving content into a blurred moving content, the blurred moving content reducing scintillation of the moving content within the second region and an appearance of a boundary separating the first region and the second region of the display of the computing device relative to an appearance of the boundary with the moving content;
displaying the blurred moving content within the second region; and
displaying the moving content within the first region.

2. The method as recited by claim 1, wherein the method for motion-induced blurring of the moving content on the display further comprises:
receiving a source resolution of the moving content as configured by a content source, wherein the content source supplies the moving content to the display;
comparing the source resolution and the first resolution to provide a resolution difference;
responsive to the resolution difference, resampling the moving content within the first region based on the first resolution and prior to displaying the moving content within the first region, the resampling configured to change the moving content from the source resolution to the first resolution;
comparing the source resolution and the second resolution to provide a second resolution difference; and
responsive to the second resolution difference, resampling the blurred moving content within the second region based on the second resolution and prior to displaying the blurred moving content within the second region, the resampling further configured to change the blurred moving content from the source resolution to the second resolution.

3. The method as recited by claim 2, wherein the determining of the speed of the moving content further comprises:
receiving a source speed of the moving content, wherein:
the moving content comprises a plurality of images consecutively received over time; and
the source speed corresponds to a speed of consecutively received images over time as configured by the content source;
detecting changes of the moving content between the consecutively received images based on the source speed, wherein the changes include one or more of the following at a distinct location of the moving content:
a change in a color of the moving content;
a change in a position of the moving content; or
a change in a size of the moving content;
detecting an increase in the speed as the changes of the moving content increase between the consecutively received images; and
detecting a decrease in the speed as the changes of the moving content decrease between the consecutively received images.

4. The method as recited by claim 3, wherein:
the speed of the moving content is set by the source speed as configured by the content source;
the speed of the moving content increases as the source speed increases and the speed of the moving content decreases as the source speed decreases; and
the blurring increases the amount of blurring as the source speed increases and the blurring decreases the amount of blurring as the source speed decreases.

5. The method as recited in claim 1, wherein the method for motion-induced blurring of the moving content further comprises:
comparing the second resolution to a resolution threshold, the resolution threshold comprising a minimum resolution to prevent scintillation of the moving content, the minimum resolution comprising a minimum pixel-density;
responsive to the second resolution being lower than the resolution threshold, blurring the moving content within the second region;
comparing the first resolution to the resolution threshold; and
responsive to the first resolution being greater than the resolution threshold, displaying the moving content within the first region.

6. The method as recited by claim 5, wherein the method for motion-induced blurring of the moving content further comprises:
determining that the second resolution is lower than the resolution threshold;
comparing the speed of the moving content within the second region to a minimum speed threshold, the minimum speed threshold corresponding to a minimum speed of the moving content to cause scintillations on the display within the second region;
responsive to determining that the speed of the moving content within the second region is greater than the minimum speed threshold, blurring the moving content within the second region;
displaying the blurred moving content within the second region of the display; and
responsive to determining the speed of the moving content within the second region is lower than the minimum speed threshold, displaying the moving content within the second region of the display.

7. The method as recited by claim 5, wherein:
the display comprises a pixel layer, the pixel layer includes:
the first pixel-density;
the second pixel-density; and
color pixels configured to display the moving content in color;
a density of color pixels is correlated with a resolution of a region of the display;
color defects are associated with the density of color pixels, the color defects including color distortions and scintillations of the moving content, the color defects increasing scintillation of the moving content within the second region and the appearance of the boundary separating the first region and the second region; and responsive to determining the second resolution lower than the resolution threshold, the density of color pixels lower than the minimum pixel-density, blurring the moving content within the second region.

8. The method as recited in claim 1, wherein the determining of the speed of the moving content further comprises:
receiving a haptic input on the display of the computing device, the haptic input performed by a user making a contact with the display, the contact made on the display to change a size or position of the moving content; and
detecting a haptic speed associated with the haptic input, where the speed is the haptic speed.

9. The method as recited in claim 1, wherein the blurring of the moving content increases the amount of the blurring as the speed of the moving content increases and decreases the amount of the blurring as the speed of the moving content decreases, the amount of blurring comprising:
a linear correlation between the amount of the blurring and the speed of the moving content, wherein an increase in the speed corresponds linearly with the amount of the blurring; or
a nonlinear correlation between the amount of the blurring and the speed of the moving content, wherein an increase in the speed corresponds nonlinearly with the amount of the blurring.

10. The method as recited by claim 9, wherein:
the display further comprises an array of pixels configured to display the moving content, the array of pixels comprising a pixel intensity for each pixel of the array;
the blurring of the moving content within the second region of the display further comprises use of a smoothing filter, the smoothing filter configured to replace the pixel intensity for each pixel with an average of pixel intensities of nearby pixels within the second region to blur the moving content; and
the smoothing filter further comprises a weight, the weight correlated with the speed of the moving content and configured to increase the amount of the blurring as the speed increases and decrease the amount of blurring as the speed decreases.

11. The method as recited by claim 9, wherein the method for motion-induced blurring of the moving content further comprises:
comparing the speed of the moving content within the second region to a maximum speed threshold, the maximum speed threshold corresponding to a maximum speed of the moving content permitted to be displayed on the computing device; and
responsive to detecting that the speed is greater than the maximum speed threshold, blurring the moving content by a constant amount of the blurring, the constant amount of the blurring configured at a static value and maintained at the static value as the speed increases above the maximum speed threshold.

12. The method as recited by claim 11, wherein the method for motion-induced blurring of the moving content further comprises:
detecting a refresh speed of the display, the refresh speed including a maximum refresh speed, the plurality of images of the moving content and a plurality of images of the blurred moving content consecutively displayed on the display based on the maximum refresh speed; and
setting the maximum speed threshold at the refresh speed, the maximum speed threshold further configured to enable blurring of the moving content within the second region by the constant amount of the blurring responsive to detecting one or more of the following:
the haptic speed greater than the refresh speed; or
the source speed greater than the refresh speed.

13. The method as recited in claim 1, wherein the method for motion-induced blurring of the moving content further comprises:
receiving a third resolution of a third region of the display of the computing device, the third resolution corresponding to a third pixel-density, the third pixel-density lower than the first pixel-density;
determining the speed of the moving content;
blurring the moving content within the third region based on the speed, the blurring configured to transform the moving content into a second blurred moving content, the second blurred moving content reducing scintillation of the moving content within the third region and an appearance of a boundary separating the first region and the third region of the display of the computing device relative to an appearance of the boundary with the moving content; and
displaying the second blurred moving content within the third region.

14. The method as recited by claim 13, wherein the method for motion-induced blurring of the moving content further comprises displaying the blurred moving content within the second region and displaying the second blurred moving content within the third region to reduce an appearance of a boundary separating the second region and the third region of the display of the computing device.

15. A computing device comprising:
at least one processor;
a display comprising an array of pixels, the array of pixels configured to enable a moving content to be viewed on the display, the array of pixels having a first region and a second region, the first region having a first resolution corresponding to a first pixel-density and the second region having a second resolution corresponding to a second pixel-density, the second pixel-density lower than the first pixel-density; and
computer-readable storage media comprising instructions, responsive to execution by the processor, for directing the computing device to perform operations comprising:
determining a speed at which the moving content is intended to be moved in the display;
blurring the moving content within the second region based on the speed, the blurring configured to transform the moving content into a blurred moving content, the blurred moving content reducing scintillation of the moving content within the second region and an appearance of a boundary separating the first region and the second region of the display of the computing device relative to an appearance of the boundary with the moving content;
displaying the blurred moving content within the second region; and
displaying the moving content within the first region.

16. The computing device of claim 15, wherein the operations further comprise:
receiving a source resolution of the moving content as configured by a content source, wherein the content source supplies the moving content to the display;
comparing the source resolution and the first resolution to provide a resolution difference;

responsive to the resolution difference, resampling the moving content within the first region based on the first resolution and prior to displaying the moving content within the first region, the resampling configured to change the moving content from the source resolution to the first resolution;

comparing the source resolution and the second resolution to provide a second resolution difference; and responsive to the second resolution difference, resampling the blurred moving content within the second region based on the second resolution and prior to displaying the blurred moving content within the second region, the resampling further configured to change the blurred moving content from the source resolution to the second resolution.

17. The computing device of claim 16, wherein the operation of determining the speed of the moving content further comprises:

receiving a source speed of the moving content, wherein:
the moving content comprises a plurality of images consecutively received over time; and
the source speed corresponds to a speed of consecutively received images over time as configured by the content source;

detecting changes of the moving content between the consecutively received images based on the source speed, wherein the changes include one or more of the following at a distinct location of the moving content:
a change in a color of the moving content;
a change in a position of the moving content; or
a change in a size of the moving content;

detecting an increase in the speed as the changes of the moving content increase between the consecutively received images; and detecting a decrease in the speed as the changes of the moving content decrease between the consecutively received images.

18. The computing device of claim 15, wherein the operations further comprise:

comparing the second resolution to a resolution threshold, the resolution threshold comprising a minimum resolution to prevent scintillation of the moving content, the minimum resolution comprising a minimum pixel-density;

responsive to the second resolution being lower than the resolution threshold, blurring the moving content within the second region;

comparing the first resolution to the resolution threshold; and responsive to the first resolution being greater than the resolution threshold, displaying the moving content within the first region.

19. The computing device of claim 15, wherein the operation of determining the speed of the moving content further comprises:

receiving a haptic input on the display of the computing device, the haptic input performed by a user making a contact with the display, the contact made on the display to change a size or position of the moving content; and detecting a haptic speed associated with the haptic input, where the speed is the haptic speed.

20. The computing device of claim 15, wherein the operation of blurring of the moving content increases the amount of the blurring as the speed of the moving content increases and decreases the amount of the blurring as the speed of the moving content decreases, the amount of blurring comprising:

a linear correlation between the amount of the blurring and the speed of the moving content, wherein an increase in the speed corresponds linearly with the amount of the blurring; or a nonlinear correlation between the amount of the blurring and the speed of the moving content, wherein an increase in the speed corresponds nonlinearly with the amount of the blurring.

* * * * *